Figure 20:
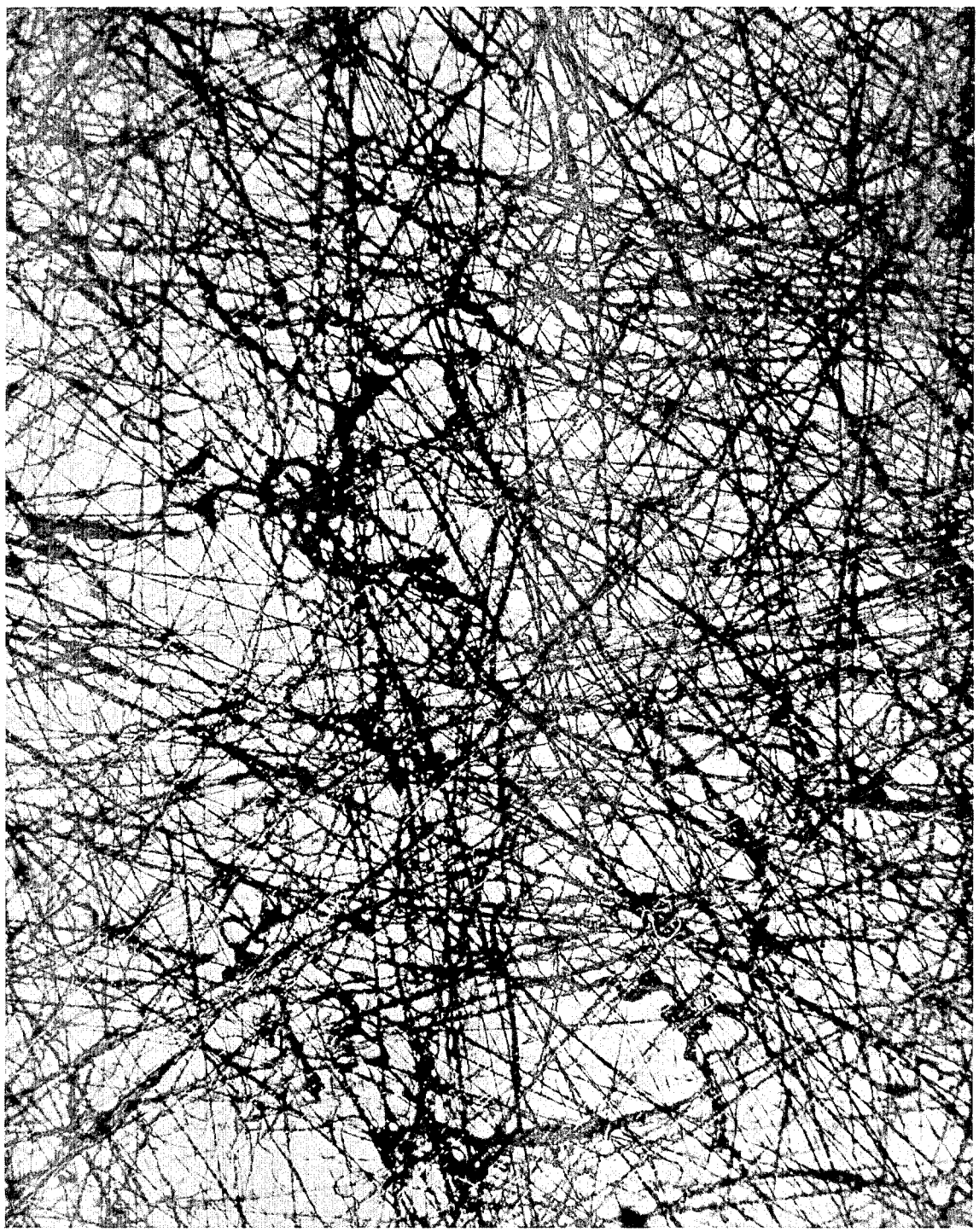

United States Patent [19]

Fine et al.

[11] 4,223,101

[45] Sep. 16, 1980

[54] METHOD OF PRODUCING FIBROUS STRUCTURE

[75] Inventors: Jerome Fine, Passaic, N.J.; Sigismondo A. De Tora, Spring Valley, N.Y.

[73] Assignee: Inmont Corporation, New York, N.Y.

[21] Appl. No.: 925,646

[22] Filed: Jul. 17, 1978

Related U.S. Application Data

[63] Continuation of Ser. No. 486,567, Jul. 8, 1974, which is a continuation of Ser. No. 116,792, Feb. 19, 1971, abandoned.

[51] Int. Cl.² .............................................. B22D 23/08
[52] U.S. Cl. .............................. 528/76; 260/30.4 N; 264/6; 264/8; 264/10; 264/24
[58] Field of Search .......................... 264/6, 8, 24, 10; 528/76; 260/30.4 N

[56] References Cited

U.S. PATENT DOCUMENTS

| | | | |
|---|---|---|---|
| 2,336,745 | 12/1943 | Manning | 156/68 |
| 3,097,085 | 7/1963 | Wallsten | 264/8 |
| 3,280,229 | 10/1966 | Simons | 264/24 |
| 3,429,953 | 2/1969 | Crompton | 264/8 |
| 3,475,198 | 10/1969 | Drum | 264/128 |

*Primary Examiner*—Donald J. Arnold
*Assistant Examiner*—James R. Hall

[57] ABSTRACT

A solution of elastomeric polyurethane in a volatile solvent is centrifugally sprayed onto a base in a strong electrostatic field to form long fibers that are swept across the base and deposited thereon in generally straight condition, overlapping and adhered to previously deposited fibers. Novel fibrous sheets of high strength are thus produced. The intersecting fibers may be ribbon-like.

20 Claims, 26 Drawing Figures

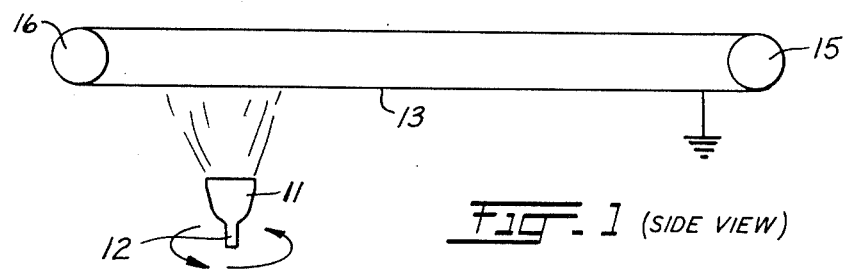
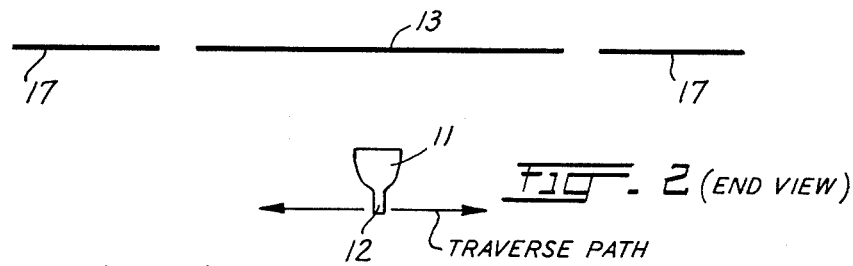
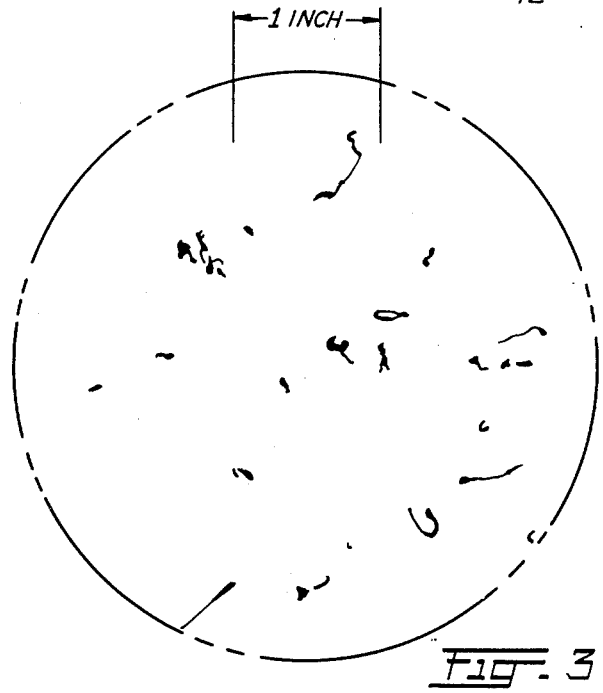
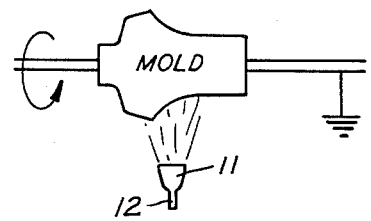
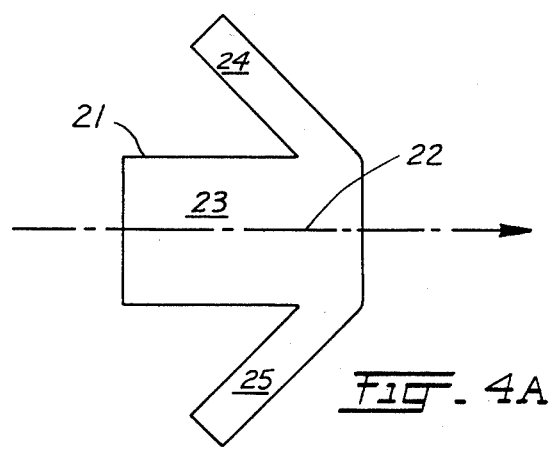

FIG. 5 |←0.1mm→|
FIG. 7 |←0.1mm→|
FIG. 6 |←0.1mm→|
FIG. 8 |←1mm→|
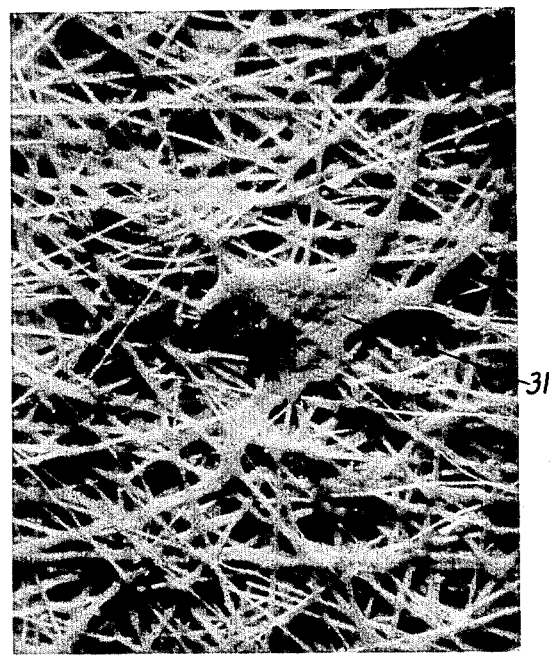

FIG. 9 ⟵ 1mm ⟶
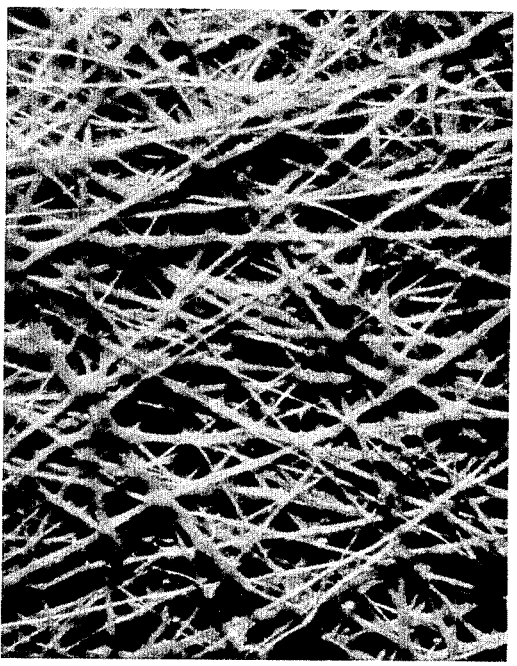
FIG. 11 ⟵ 1mm ⟶
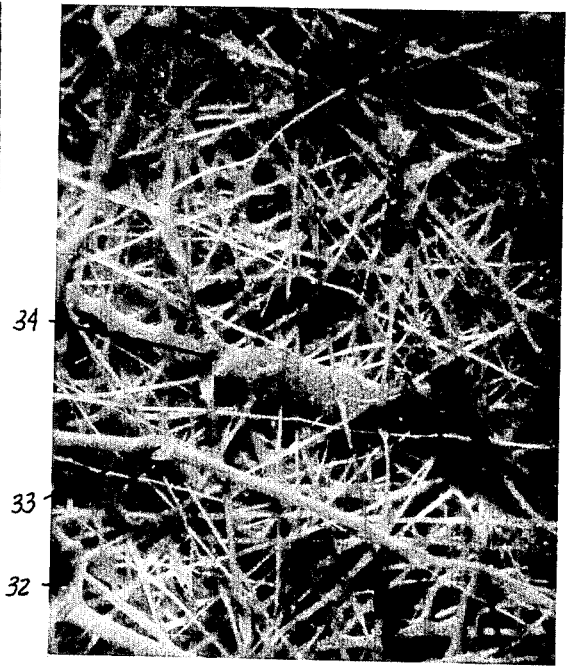
FIG. 10 ⟵ 1mm ⟶
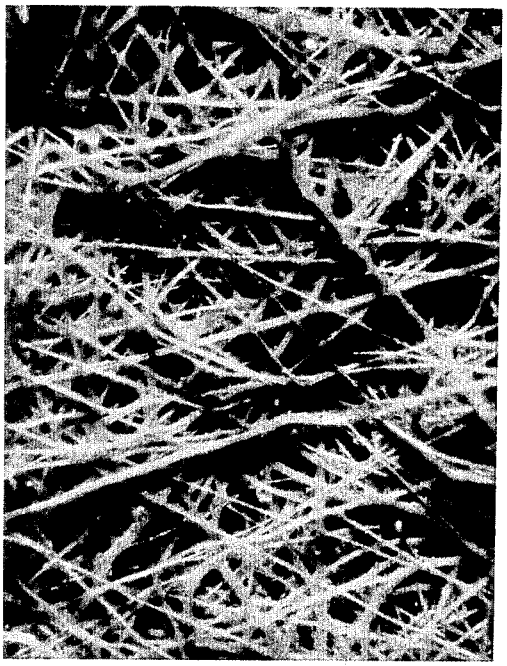
FIG. 12 ⟵ 1mm ⟶
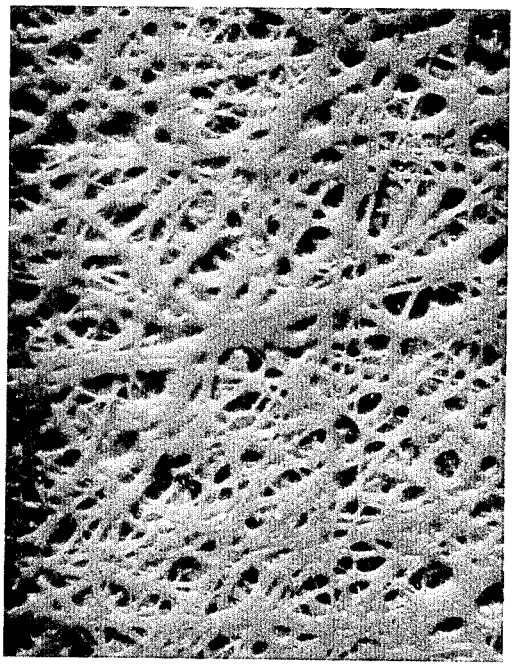

FIG. 13 |←— 1mm —→|
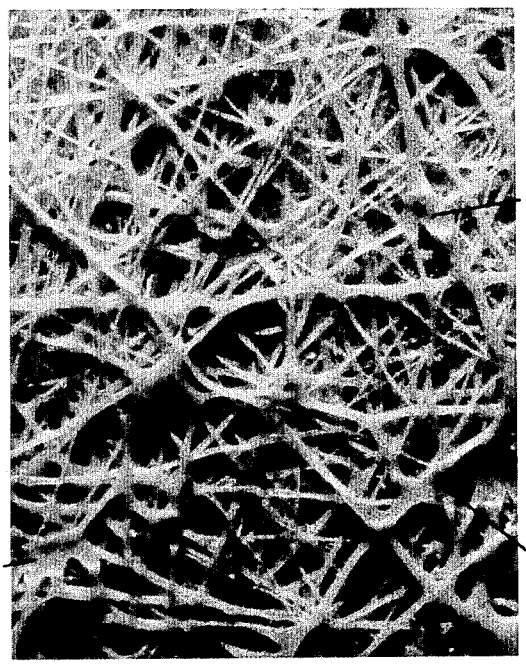
FIG. 14 |←— 1mm —→|
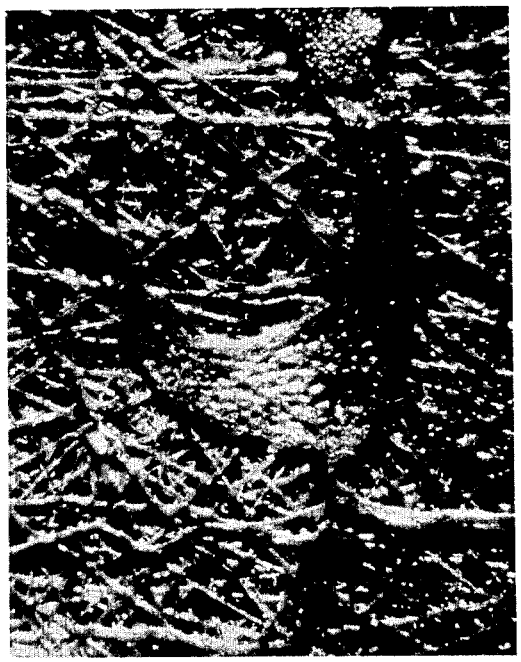
FIG. 15 |←— 1mm —→|
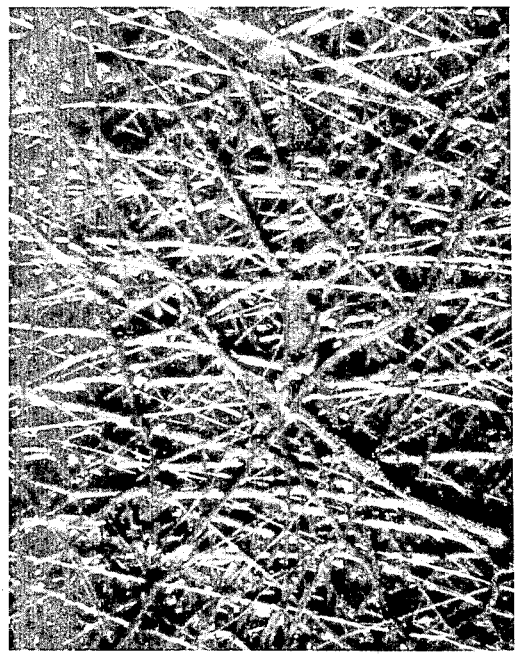
FIG. 16 |←— 0.5mm —→|
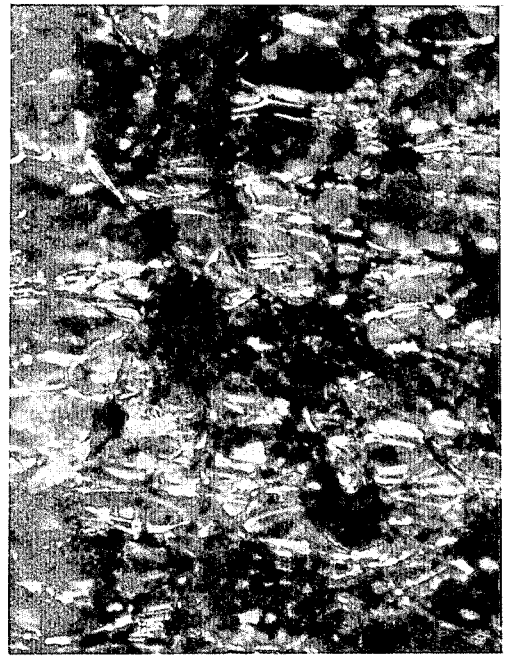

FIG. 17 |← 1mm →|
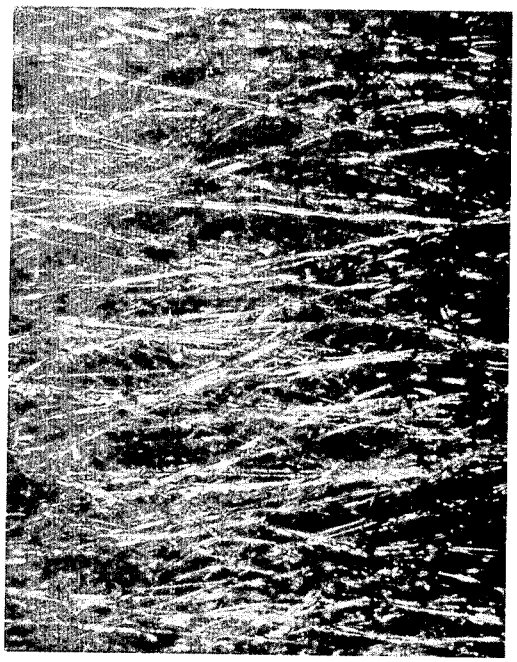
FIG. 19 |← 1mm →|
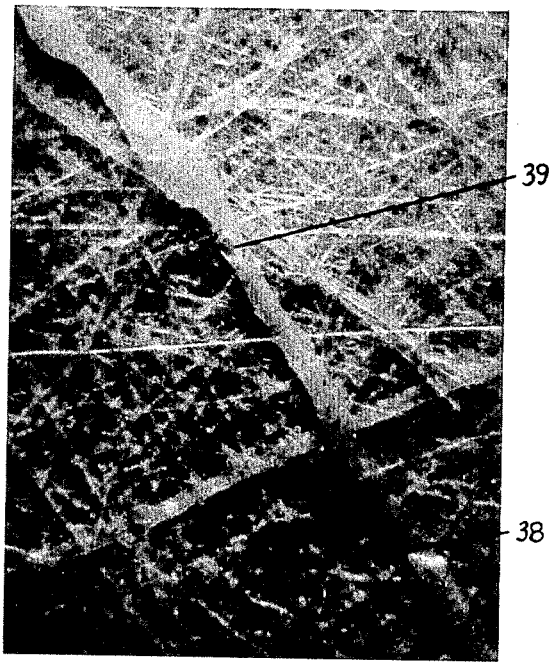
FIG. 18 |← 1mm →|
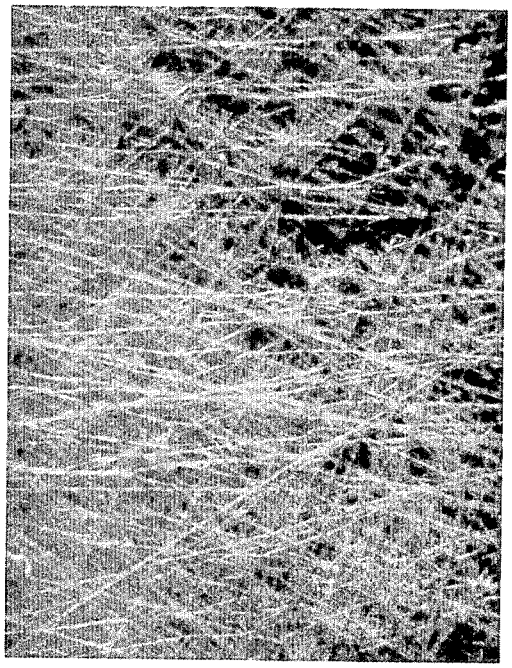
FIG. 22 |← 1cm →|
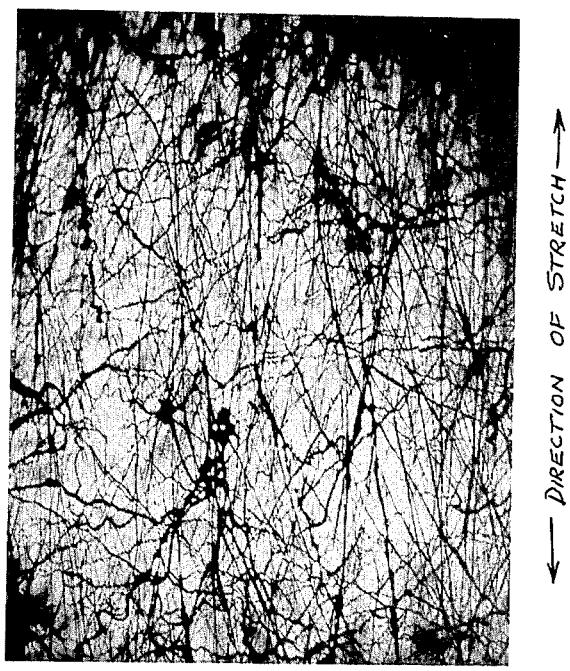

|←―0.1 inch―→|

FIG. 23 |←— 1cm —→|
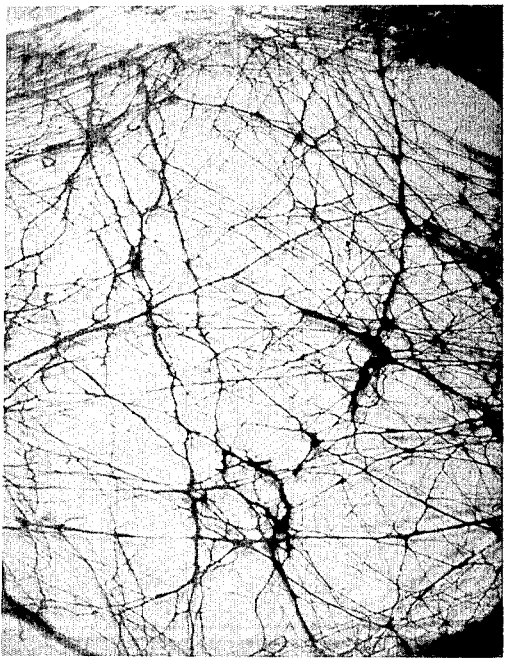
←— DIRECTION OF FIRST STRETCHING —→
←— DIRECTION OF SECOND STRETCHING —→
FIG. 25 |←— 1mm —→|
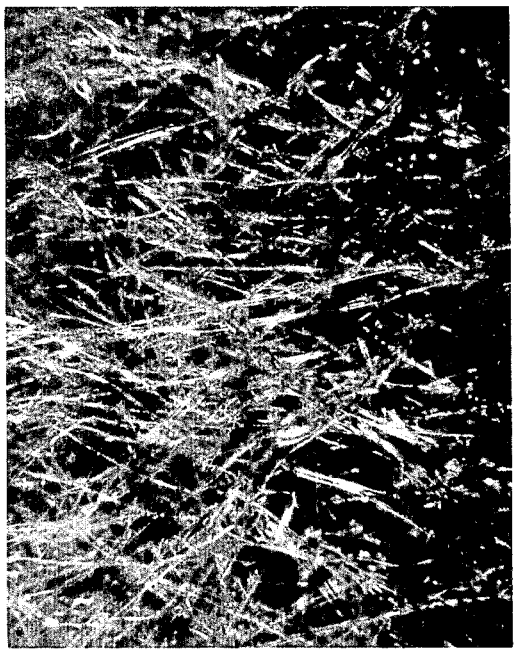
FIG. 24 |←— 1mm —→|
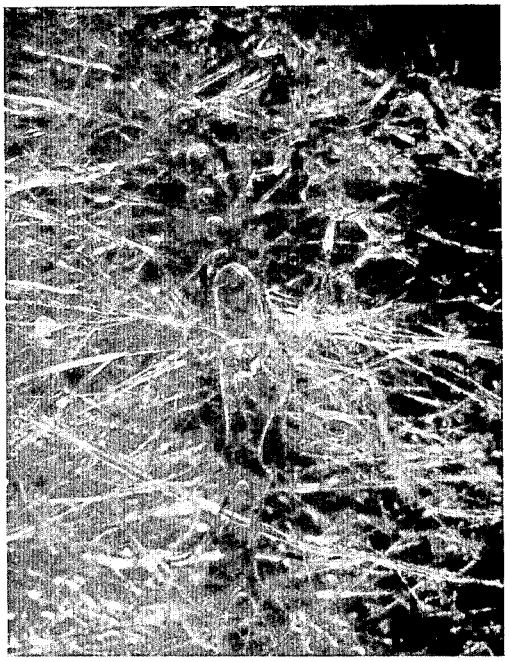

METHOD OF PRODUCING FIBROUS STRUCTURE

This is a continuation of application Ser. No. 486,567, filed July 8, 1974, which is a continuation of Ser. No. 116,792 filed Feb. 19, 1971, now abandoned.

This invention relates to a new method for producing fibrous structures and to novel products that can be made by that method.

It has previously been proposed (see, for instance, U.S. Pat. Nos. 3,232,819 and 3,325,322) that leather-like or cloth-like fibrous structures be produced by pneumatically spraying a solution of an elastomeric polyurethane in a volatile solvent, partially drying the resultant droplets into tacky particles while propelling them by means of a gas stream forcibly against a forming surface and continuing the spraying to deposit a structure of filamentous particles. The resulting structure is described in the patents as comprising an accretion of irregularly shaped nodular particles and randomly arranged overlapping, intersecting and interfitting solid flamentous strands having lengths predominantly in the range of 200 to 2500 microns and diameters predominantly 10 microns or less, this accretion being coalesced into a unified air-permeable structure.

Like the process just described, the present invention also forms clothlike or leatherlike air-permeable structures from solutions of an elastomeric polyurethane in a volatile solvent. These structures are, however, much stronger and tougher than those produced by the known spraying processes and, in addition, have other unusual and highly desirable properties which will be described more fully below.

One aspect of the present invention is illustrated schematically in FIGS. 1 and 2 of the accompanying drawings. Reference numeral 11 designates a circular cup (or "bell"), open at the top, which is spinning about a vertical axis 12. The solution of elastomeric polyurethane is fed to the center of the cup and is propelled by centrifugal force in a layer (which becomes progressively thinner from the center of the cup outwards) toward and across the edge of the cup, into the atmosphere. The cup carries a high elastrostatic charge. The atmosphere is substantially quiescent; for instance, the operation is carried out in a room having facilities for low velocity exhaust of air to prevent buildup of solvent vapors but with no provision for air blasts directed at the polyurethane material at any stage.

Above the cup is an endless belt 13 which is driven continuously at a relatively slow rate around rollers 15, 16. The belt 13 is electrically grounded. It may, for instance, be made up of aluminum screening.

The combined actions of the centrifugal and electrostatic forces, together with the partial evaporation of the volatile solvent, cause the formation of long fibers of the polyurethane which are attracted toward the belt, as shown. These fibers (originating with material that has been flung out, under the influence of the centrifugal force, in paths which are generally tangential of the circumference of the rapidly spinning cup) sweep across the belt and are deposited thereon in generally straight conditions, e.g. in smooth curved paths whose radius of curvature is relatively large, well above 4 cm and generally above 7 cm. Thus, in one typical case (in which, however, the belt 13 was stationery and the position of the rotating cup 11 was not moved during the process) there was produced, on the belt, an annular fibrous structure having an outside diameter of about 30 inches and an inside diameter of about 16 inches; in that case the upper surface of the cup 11, (which had a diameter of 6 inches and was rotating at 900 rpm) was 18 inches below the horizontal lower surface of the belt.

As the solvent-containing fibers sweep across the belt they adhere thereto although retaining their identity as fibers. A fibrous structure is thus built up. Successively formed fibers adhere to the surfaces of the already deposited fibers at spaced points of contact. As previously indicated, when both the belt and the axis of the rotating cup are stationery there is built up an annular structure, in which the fibers are oriented principally in one general direction, i.e. circumferentially of the annulus. Despite this orientation the material has considerable strength in the transverse direction, the strength in the transverse (radial) direction being typically on the order of one half the strength in the circumferential (longitudinal direction) of the annular structure. When the belt is moved, but the axis of the rotating cup is kept stationery, there is produced a sheet in which the direction of the fibers is generally longitudinal at the edges of the sheet, is both transverse and longitudinal in two parallel bands (one adjacent to each of said edges), and is generally transverse in the middle zone of the sheet, the thickness of the sheet being greater in said bands than at the edges or the middle of the sheet. A similar type of structure is formed when the belt is kept stationery and the vertical axis of the rotating cup is moved back and forth along a straight and level horizontal path.

A more isotropic structure is produced by traversing the axis of the cup, as just described, and simultaneously moving the belt. In this case the structure produced is generally isotropic except for two relatively narrow bands along its edges. These bands may, if desired, be severed from the main body of the sheet in any suitable manner. Two or more spaced traversing cups may also be employed. Additionally, there may be used an arrangement (shown in FIG. 2) in which length of traverse of the cup or cups is such that, at the each end of traverse, the pattern of fibers extends beyond the edges of the moving web, with suitable provision being made for taking up the resulting excess fibers; thus at each end of the traverse the axis of rotation of the cup may be directly below the edge of the moving belt and there may be stationery, or moving, grounded supplemental collecting surfaces 17 situated at both sides of the belt to take up the excess fibers and prevent them from building up on the edge of the belt or on the opposite side of the belt.

A more isotropic structure may also be produced by using a number of spaced stationary cups. The cups are preferably spaced apart a distance about equal to or greater than the combined radii of the annular fiber deposition patterns produced by the cups, e.g. adjacent cups are preferably spaced with their axes at least about 30 inches (say, about 36 or 38 inches) apart to minimize distortion of the deposition patterns by the interference of adjacent electrostatic fields. However, it is within the broader scope of the invention to employ closer spacing.

The annular fiber deposition pattern may be altered by the use of air currents or by suitably positioning near the cup, one or more charged bodies, e.g. carrying a charge of the same sign as, and generally of the same magnitude as, the charge on the cup. Best results, however, have been obtained by avoiding such expedients. One may also use gentle air currents which do not disrupt or entangle the moving fibers but which aid in removing solvent or directing or guiding the fibers.

The applied voltage and the distance from the cup to the belt are preferably such that substantially all the material fed to the cup will reach the plane of the belt. Thus, for a 15% solution of elastomeric polyurethane in tetrahydrofuran very good results have thus far been obtained when the belt is in the range of about 13½ to 25 inches (preferably about 18 to 20 inches) above the rim of the cup and the voltage is in the range of about 50 to 120 KV (preferably about 90 to 100 KV). For instance, using a single stationery cup having a rim 6 inches in diameter and rotating at 900 rpm, the proportion of the fibers which did not accumulate on a belt 60 inches wide when the voltage was 90 KV became noticeable when the belt was about 23 inches above the rim of the cup. The distnce should, of course, not be so short that there is a noticeable electrical charge (e.g. a spark or corona discharge) passing through the atmosphere from the charged cup to the grounded belt. It will be seen that in the foregoing tests the voltage gradient was preferably in the range of about 4 to 8 KV per inch, when measured directly from cup to web. It is preferable that there not be present any grounded body which is significantly closer, then the web, to the cup so as to minimize the tendency for the fibers to be attracted to such a body.

The mode of formation and deposition of the fibers is not clearly understood. The rotating of the cup forms the polyurethane solution into a thin substantially uniform film on the inside of the cup. It is believed that under the action of the electrostatic field this film may form a series of spaced extensions, or tongues or cusps, extending outwardly from the sharp rim of the cup. In the absence of the field (i.e. when the voltage is zero) the rotation of the cup causes the solution to be thrown outward horizontally as droplets, some of which have short threadlike tails as can be seen from FIG. 3, which is a rough copy of the pattern made when a sheet of ordinary writing paper is placed, momentarily, in the path of the spray of black-pigmented polyurethane coming from a 6 inch diameter cup (rotating a 900 rpm) at a point several feet from the cup; the black spots are the droplets, all of which adhere to the sheet of paper; the average weight per dried droplet in this instance is about 0.2 mg. The fibers may be formed by extension of droplets that have left the cup and are moving through the air. The ribbon-like fiber cross-section noted in Example 1 below would indicate that fiber formation occurs while the droplets are in a flattened condition or possibly occurs directly from the projecting tongues. The fact that the fibers are deposited with an orientation generally circumferential of the annular pattern mentioned above may indicate that they originate directly from the circumferentially moving projecting tongues. In any event it is observed that despite the length of the fibers, and their whirling pattern, no entanglement or twisting together of the fibers is encountered, and the ribbon-like fibers appear to be laid down flat, without significantly twisting on themselves. The ribbon-like cross-section may contribute to the straightness of the deposited fibers since it is much more difficult to bend a ribbon in its plane than it is to bend a round fiber of the same weight per unit length. The ribbon-like cross-section may also contribute to more rapid release of solvent. At the same time it may contribute to better adhesion of the fibers to each other since a ribbon-like fiber deposited flat across a similar ribbon-like fiber below it will have a greater area of close contact with the lower fiber than when the fibers are round.

The polyurethane solution can be supplied to the cup over a wide range of delivery rates. For instance, rates ranging from about 4 to 15 ounces per minute per cup have been used successfully with a 15% solution of polyurethane in tetrahydrofuran.

While the process makes it possible to form the fibrous product at high rates, it is best to allow adequate time for some solvent release from the deposited fibers between successive depositions thereof.

By regulating the speed of the web, in relation to the traversing speed, and the rate of supply of solution and volatility of the solvent one can control the density (and physical properties) of the product, by simple preliminary trials in the light of the teachings of this application. Particularly useful products thus far made in accordance with this invention have densities (after heating in an oven to remove residual solvents, e.g. at 210° F. air temperature for 10 minutes) within the range of about 0.1 to 0.5 or 0.6 g/cc, more usually in the range of about 0.2 to 0.4 g/cc.

The rate of rotation of the cup and its diameter may also be varied widely. Thus, very good results have thus far been obtained with bells having diameters ranging from 2 to 8 inches at speeds ranging from 900 to 3600 rpm. In general the speed and size of the cup is preferably such that the linear speed of its rim (from which the material is released into the atmosphere) is above about 3000 inches per minute.

The freshly produced material generally contains residual solvent, as indicated, for instance, by the odor of the freshly produced material. The amount of solvent in this fresh material is generally well below about 15%, e.g. below about 10%. On standing the volatile solvent will generally evaporate substantially completely. It is usually preferable to accelerate this evaporation by heating, e.g. in an oven at about 90° to 120° C. Such heating may cause some shrinkage of the product; usually the shrinkage is well below about 10% in linear dimension.

As indicated, the belt on which the fibers are collected may be perforated, e.g. aluminum wire screening (such as is used for window screening, e.g. no. 8 wire, 12 mesh) has been used. The belt may also be substantially impervious, e.g. a series of metal plates or foil. In each case a continuous substantially uniform sheet is produced, with the fibers bridging any perforations. Thus, although the face of the fibrous sheet which has been in contact with the screen often has the screeen pattern impressed thereon, the fibers themselves bridge the openings of the screen to form a structure which is substantially uniform and does not show any orientation corresponding to the holes and wires of the screen and thus does not follow the screen pattern.

By using a collecting belt having smooth flat surface, such as a sheet of glossy aluminum foil, one can produce a fibrous product which (after it is stripped from the web) has a relatively shiny surface (having a "wet look") at the face which was formed in contact with the smooth surface of the belt. It seems that a portion of the solvent-containing fibrous material that first reaches the surface of the belt flows onto that surface forming an extremely thin and permeable film (generally discontinuous) reinforced by the fibers. The final product produced by continued deposition of the fibers can be of any desired thickness but the effect is observed even in very thin structures; thus, in a diaphanous product formed in contact with an aluminum foil collecting surface and stripped therefrom before a thicker fibrous structure was build up, one face has the shiny wet look while the other face has a dull appearance. It will be understood that fibers that are subsequently applied in the process adhere to the already deposited fibers at this dull face at spaced points of contact. A similarly shiny effect may be obtained by applying a hot smooth surface (e.g. by transferring heat from a hot iron through a sheet of "release paper" having a non-adhering surface) to the dull-surfaced sheet causing limited flow of the fibrous material at the surface, yielding a shiny product having a "wet look" but having a high degree of permeability.

It will be understood that the actual collecting surface need not be an electrical conductor. For instance, after a substantial layer of fibers had already been deposited on the belt, a sheet of writing paper was placed on the already deposited fiber layer; this did not interfere with the continued deposition of the fibers and a fibrous structure was formed directly on, and adhering to, the paper. Similarly, in the production of most products within the scope of the invention, the fibers being laid down do not come in contact with the grounded belt at all, but instead are deposited onto the layer of previously deposited electrically insulating fibers.

Instead of forming the fibrous structure on a substantially flat belt, one may use other collecting surfaces. For example, permanently shaped garments or portions of garments may be formed by directly depositing the fibers on a suitable three-dimensional mold, as shown in FIG. 4. The mold or other collecting surface may be of metal, e.g. wire mesh; or it may be of electrically insulating material (e.g. papier mache) carrying a conducting coating (such as a coating having a substantial conductive carbon content, or a commercially available "Ransprep" coating, as described in the articles by Miller and Spiller "Electrostatic Coating Process" which appeared in "Paint and Varnish Production" June and July 1964). The mold may be rotated during the process, as shown in FIG. 4; such rotation may be at a relatively rapid rate, so that the mold rotates many times, e.g. a thousand times or more, during the deposition of a 0.2 inch thick layer of the fibers thereon; or it may be at a relatively slow rate, so that only one or two or a few rotations occur during the formation of such a layer. When using a mold of a size to form a garment (as in FIG. 4) it is often desirable to use a spinning cup of relatively small diameter (e.g. 2 inches) for best deposition of the fibers. The garment may be readily slipped off or peeled off the irregular mold; being highly elastic, it stretches during this operation, but then recovers its molded shape rapidly.

While this application refers to feeding the solution to a rotating "cup" or "bell" good results have also been obtained by using a flat circular rotating disk in place of the bell; other means of imparting centrifugal force to the solution will be apparent to those skilled in the art. Suitable cup constructions are shown in U.S. Pat. Nos. 2,809,902; 2,764,712 and 2,784,114, as well as in the published Killer and Spiller articles mentioned above.

The solvent employed in the process preferably has a relatively high volatility at the temperature of operation, which is most conveniently about room temperature. One particularly suitable solvent is tetrahydrofuran which has an evaporation rate of above 40 (as compared to diethyl ether whose evaporation rate is taken as 100), specifically 47; a dielectric constant (at 20° C.) below 10, specifically 7.58; a vapor pressure at 20° C. of above 100 mm Hg, specifically 143 mm Hg; a boiling point of 66° C., a molecular weight of 72 and a calculated solubility parameter of 9.15. The solution is preferably substantially free of water. The tetrahydrofuran is, however, so volatile in the process that when the air has a high relatively humidity (e.g. air at 75° F. and 70% RH) the product being formed on the belt feels wet to the touch as a result of condensation of moisture thereon owing to the cooling effect of the evaporation of the solvent. The process, however, operates well, both in the presence of such moisture and when the air is drier. (It is noted that the tetrahydrofuran is miscible with water while the polyurethane is insoluble in tetrahydrofuran-water mixtures containing substantial proportions of water). Other volatile solvents may be employed, alone or in admixture with tetrahydrofuran; the particular solvent used will, of course, depend on the solubility of the particular polyurethane chosen for use in the process. Such solvents (e.g. acetone) are well known to those skilled in the polyurethane art. It is also within the broader scope of the invention to have present in admixture with the volatile solvent a minor proportion of a solvent of lower volatility (e.g. 5% of N,N-dimethylformamide) which remains in large part in the deposited fibers and which may then be removed (as by evaporation in an oven or by extraction with aqueous medium). Also the volatility of the less volatile solvents can be increased by operating the entire process in a heated atmosphere or at subatmospheric pressure.

The concentration of the solution is desirably such that the material leaving the rim of the rapidly rotating cup has a relatively high viscosity. Thus, it is usually preferable to supply the solution to the rotating cup at a viscosity above about 500 centipoises (e.g. about 1000 centipoises). When using cups of such large size that considerable evaporation of solvent occurs as the material travels to the rim of the cup, lower viscosities may be used to compensate for the loss of solvent. Typically the solution fed to the cup contains about 5 to 20% solids. The viscosity of the material increases rapidly as the solvent is removed; for instance the viscosity of a 15% solution of the polyurethane used in Example 1 below in tetrahydrofuran is typically about 1000 centipoises, while a 16.2% solution thereof has a viscosity in the neighborhood of 2500 centipoises, a 20% solution has a viscosity of around 10,000 centipoises, a 25% solution has a viscosity in the range of 40,000–50,000 centipoises and a 30% solution has a viscosity of about 90,000 cps. or more.

The polymers used in the practice of this invention are preferably of the soluble thermoplastic elastomeric type, having few, if any, chemical cross links, which polymers are believed to derive their mechanical properties primarily from hydrogen bonding forces rather than chemical cross linkage. The polyurethane preferably is a fiber-forming material having an intrinsic viscosity above 0.6, preferably above 0.8 (e.g. about 0.9 to 1.4). One preferred type of elastomer is composed of segments having urethane linkages and intermediate longer segments which may for example be of polyester or polyether character. The urethane linkages are preferably derived from aromatic or cycloaliphatic diisocyanates, such as diphenyl methane-p,p'-diisocyanate, or methylene bis(4-cyclohexylisocyanate) and are thought to provide so-called "hard" segments in the polymer molecule, while the other segments (e.g. the polyester or polyether segments) are flexible or "soft". Polyurethanes of this type are known in the art. They may be made, for instance, by reacting a relatively low molecular weight hydroxyl-terminated polyester or polyether (e.g. of molecular weight below 5000 and preferably between about 400 and 3000, e.g. 800–2500 with a diisocyanate and a low molecular weight difunctional chain extender such as a glycol, diamine or amino alcohol.

After the fibrous structure has been produced on the collecting surface it may be readily removed from that surface (as by stripping it off mechanically) and may be given a variety of after-treatments. Thus its abrasion resistance may be improved greatly by smoothing the surface, as by treatment thereof with solvent or swelling agent (as illustrated in Example 1b, below), the amount of the solvent or swelling agent being insufficient to destroy the main fibrous structure. Typically after such a treatment the material has an abrasion resistance of over 5,000 cycles (e.g. well over 10,000 cycles) as measured on a Wyzenbeek tester, whereas the abrasion resistance prior to such treatment may be under 1000 cycles, (e.g. less than 400 cycles). The surface may also be smoothed, and the abrasion resistance improved, by the application of a heated surface particularly a smooth heated surface (as illustrated at the end of Example 7 below) or by the application of a smooth polymeric coating which coating may be of the same polyurethane (as illustrated in Example 6 below) or of a different polyurethane or of any other coating material such as those commonly used for the coating of woven or nonwoven fabrics or leather. The fibrous structure may also be dyed (see also Ex. 6) or printed, as with a conventional textile printing paste, to impart decorative effects. It may be embossed by heat and pressure (as illustrated in Example 3) in any desired surface pattern and also may be consolidated and densified by heat and pressure. It may be laminated to other materials or several thicknesses of the same type of fibrous structure may be laminated by heat, adhesives or other suitable techniques. The surface of the fibrous structure may be abraded (as by machine sanding at temperatures insufficient to fuse the fibers) in order to impart a napped or suede-like finish having projecting fibers; such abrading may also follow a surface smoothing treatment (e.g. with solvent or heat or both) and/or a densification or consolidation treatment.

The fibrous structures of this invention may be produced in various thicknesses, from a diaphanous very thin sheet to a relatively thick structure; thus thicknesses above 0.04 inch have been produced without difficulty and the indications are that considerably higher thicknesses, e.g. 0.1, 0.2, 0.5 inch or more may be made in the same way, e.g. by simply continuing the fiber deposition process for a longer time. In general the invention finds its greatest utility for the production of fibrous structures weighing above 15, more preferably above 30, and still more preferably above 60 grams per square yard. The products (even when relatively thin and having weights per square yard at the lower end of this range, such as 0.009 inch thick material of Example 13, which weighs about 43 grams per square yard) have excellent stitching characteristics and very high stitch-tear resistance. Thus, they may be used for the manufacture of garments, upholstery (e.g. breathable automobile seat covers) etc. by conventional cutting and stitching techniques. They also heat-seal readily and thus known heat sealing techniques (e.g. those involving high frequency heating) may be employed instead of, or together with, stitching. The cut edges of the material have very little, if any, tendency to ravel. Among the garments which may be produced are, for instance, sweaters, blouses, golf jackets, ski jackets (where the low thermal conductivity of the material is advantageous), socks, other hosiery (e.g. thin run-resistant stretch hose).

As indicated garments can be made from sheets of the new fibrous structures by conventional cutting and sewing techniques, (or by cutting and heat-sealing), and can also be produced directly, as in the manner illustrated in FIG. 4. Also, a part of the garment may be produced directly and other parts of the garment, may be made in other ways and attached thereto, as by stitching, adhesive or heat-sealing. For instance, a structure may be made as in FIG. 4 using a mold shaped three dimensionally like a women's torso, after which the material may be cut to provide arm holes and sleeves may be secured at these arm holes.

The thickness of the fibrous structure can be varied, within that structure, by using suitably shaped and positioned collecting surfaces. For instance, in the use of the mold as shown in FIG. 4 a thicker deposit is formed at the shoulder portions of the mold, which portions approach the spinning cup more closely during the process and thus tend to attract more fibers; thus garments having built-in padding at predetermined zones can be formed directly. The thickness of the deposit may also be controlled by using series of cups to which the polymer solution is fed a different rates. For example, as illustrated in FIG. 4A a long-sleeved sweater or blouse may be produced by passing a collecting mold 2: horizontally (in the plane of the paper and in the direction indicated by the arrow) above three rotating cups, one located under the path of the axis 22 of the torso portion 23 and the other two located under the paths of the respective sleeve portions 24, 25 say, about midway between the wrist and shoulder, then rotating the mold 21 180° about its axis, passing it back over the same cups, horizontally in the direction opposite to that of the arrow, and repeating the process until the desired thickness is built up, the feed rate of polymer solution to each of the cups under the sleeve portions being substantially lower than the feed rate to the cup under the torso portion. The mold 21 may be substantially flat and horizontal.

This process of this invention has resulted in the production of strong fibrous structures that may be dry cleaned (as with conventional dry cleaning solvents such as perchloroethylene) with little dimensional change. They may also be washed with aqueous detergents.

Composite structures may be produced by using an appropriate collecting surface which is to form part of the final product. For example a metal part such as a sheet metal engine hood or trunk door for an automobile may be used as the collecting surface and the fibrous structure may be deposited directly thereon so that the fibrous structure constitutes an insulating, or sound-absorbing or cushioning layer adhered to the lower portion of the hood or trunk door. Collecting surfaces having open spaces may be used, since (as mentioned earlier) the long fibers tend to bridge the spaces. For instance, helical springs (having their successive coils spaced say ½ inch apart) may serve as mold-like collecting surfaces so that the fibrous structure forms a sleeve-like sound-absorbing or cushioning enclosure around the springs. Panels for station wagons may also have the fibers deposited directly thereon. The fibrous structures may also be used as coverings for walls, generally.

The following Examples are given to illustrate this invention further. In the Examples all pressures are atmospheric unless otherwise indicated. In the application all proportions are by weight unless otherwise indicated.

EXAMPLE 1

(a) The apparatus illustrated in FIGS. 1 and 2 is used. Each cup is 6 inches in diameter, rotating at 900 rpm, with the rim of each cup being 18 inches below the endless belt. The belt is grounded while the cup is maintained at a voltage of 100,000 volts positive. The belt is driven continuously and travels horizontally at a speed of 9 feet per minute, while each cup is traversed horizontally (in a direction perpendicular to the direction of travel of the belt), at a speed of 96 feet per minute, back-and-forth over a path 78 inches long. The cups, which are spaced 3 feet apart, are situated on an imaginary line which is parallel to the direction of travel of the belt (which line is of course traversed back and forth as indicated). The belt is 60 inches wide and has a total length of about 21 feet so that the length of each horizontal reach of the belt (that is the length between the two end rolls 15, 16 is about 10 feet.)

A 15% solution of elastomeric polyurethane in tetrahydrofuran ("THF") containing yellow pigment (in amount such that the ratio of polyurethane to pigment is about 13.4:1) is fed to each cup at a rate of roughly 6.7 ounces per minute (the total feed rate thus being roughly 13.4 ounces per minute).

The process is continued for 57 minutes to form a fibrous sheet which is then removed from the belt and placed in a circulating air oven at about 210° F. for about 15 minutes to remove residual solvent.

(b) One face of the sheet (the face that was not in contact with the belt) is sprayed lightly with a mist of THF; this causes the sprayed surface to become wrinkled (presumably owing to the swelling and consequent lengthening of the fibers which are near the surface). The THF is then removed by placing the material in a hot air oven, having an air temperature of about 210° F. for about 10 minutes; on removal of the THF the wrinkles disappear. This THF treatment gives the sheet a smoother but still dull appearance substantially free of occasional projecting loose portions of fibers, deepens the color somewhat, and improves its abrasion resistance considerably. A light surface spray of silicone lubricant (e.g. dimethyl silicone) is then applied to the treated face.

FIGS. 5 to 9 are views of portions of the THF-treated face, at two different magnifications, while FIGS. 10 and 11 are views of portions of the face which was formed in contact with the belt. It will be seen that most of the fibers are straight and have widths in the range of about 10 to 50 microns although a minor proportion, at or close to the surface, are up to about 100 microns wide.

Although the filaments generally have the appearance of being unfused at points of contact, with each retaining its structural identity at the crossing points, the filaments do tend to adhere to each other firmly at such crossing points. Most of the filaments are monofilament structures but there are instances of branching in which a single filament seems to divide or branch into two or more narrower filaments with no visible separation within the body of the parent filament. These branched structures may have originated as a result of lateral fusion between substantially parallel narrower filaments; similarly at least some of the broader filaments may have resulted from such fusion. A small proportion of the material is present as flattened substantially non-fibrous masses 31 which may have widths up to say 400 microns. In general however it will be seen that those straight filaments which are at about the same level in the sheet and are within a few degrees (e.g. 15°) of parallelism tend to be spaced apart by a distance at least twice the thickness of the filaments (e.g. some 3 to 20 times their thickness, or more).

Examination of the fibers under a stereo microscope indicates that they largely have a ribbon-like structure, with the wide faces of the fibers being in generally parallel planes which are parallel to the faces of the sheet. This is confirmed by examination of the end of a typical fiber cut from the sheet; its cross-section is dog-bone shaped (e.g. the shape is, roughly,, the width being about twice the maximum thickness.

In FIG. 11 one can see at 32, 33, 34 the impressions of the wires of the belt on which the structure was formed. Presumably the very first fibers arriving at the belt were somewhat deformed locally at some of their points where they contacted the belt. These initially deposited fibers bridged the space between the wires of the belt and served as a base across which the other fibers were subsequently deposited.

(c) The THF-treated surface of the material is ironed to give it a smoother and somewhat glossy surface by placing the material on a firm surface with the THF-treated surface uppermost, placing a sheet of conventional shiny release paper on the upper surface of the fibrous sheet and ironing the assembly with a hot electric hand iron (of conventional construction, with the heat set at the level conventionally used for ironing cotton fabrics) so that the heat penetrates through the release paper; the assembly is then allowed to cool and the release paper which does not stick to the fibrous sheet, is removed. FIG. 12 is a photomicrograph of the top surface of the resulting ironed fibrous sheet and FIG. 13 is a photomicrograph of its bottom surface. It will be seen that substantial fusion and spreading has occurred on the top surface, which though shiny, still has a high porosity, while the structure of the bottom surface remains substantially unchanged. (Spaced deformations 36, 37, 38 corresponding, like those seen in FIG. 11, to the wires of the belt on which the structure was formed are clearly visible in FIG. 13).

EXAMPLE 2

The procedure of Example 1a and b is used, except that the feed rate per cup is roughly 6.7 ounces per minute the weight ratio of polyurethane to pigment is about 8.4:1 and the elapsed time is 45 minutes.

EXAMPLE 3

(a) The procedure of Example 1a and b is used, except that the solution is pigmented with a mixture of red, black, yellow and violet pigments to give a brownish purple-colored material, the weight ratio of polyurethane to pigment being in the neighborhood of 10:1 and the elapsed time is 55 minutes.

(b) The sheet is then embossed in a fine leather grain pattern by passing it through the nip between a heated metal embossing roll and a rubber roll, at a rate such that the sheet is in contact with the heated roll whose surface temperature is about 250° F., for less than 1 minute (e.g. ½ minute). FIG. 14 is a photomicrograph of the embossed surface face and FIG. 15 is a photomicrograph of the opposite surface. The embossing procedure makes the material considerably thinner overall (reducing its overall thickness by about 20%) and gives it a non-fibrous appearance (to the naked eye), with the surface that was in contact with the embossing roll having leather-like grain, corresponding to the grain pattern of that roll. Microscopic examination of that surface (as illustrated in FIG. 14) shows that fusion of the fibers has occurred only locally at the troughs of the grain pattern (corresponding to the ridges of the embossing roll) while the fibers in the areas between those troughs retain their fibrous structure and straight appearance. Presumably the local bonding resulting from the fusion in the troughs serves to maintain the whole structure stably in its thinner compacted condition. Under the microscope the opposite surface (illustrated in FIG. 15) shows little, if any, change.

EXAMPLE 4

The procedure of Example 1a and b is used, except that the solution is pigmented with black pigment, the polyurethane: pigment ratio being about 13:1 and the elapsed time is 52 minutes.

EXAMPLE 5

The procedure of Example 4 is used, except that the feed rate is decreased to roughly 7.0 ounces per minute, (as compared to roughly 7.4 ounces per minute in Example 4), the polyurethane:pigment ratio is about 8:1 and the elapsed time is 53.5 minutes.

EXAMPLE 6

The procedure of Example 1a is used except that only one cup is used, the feed rate to that cup is roughly 7.9 ounces per minute, the cup is situated with its rim 19.5 inches below the bottom of the belt, its traverse speed is 156 feet per minute, the voltage is 90,000 volts, the belt speed is 16.5 feet per minute and the elapsed time is 44 minutes. The polyurethane is unpigmented. After removal of the solvent the material is dyed light brown by dipping it in solution of an isopropanol-soluble solvent dye in isopropanol at a temperature of 140° F. and dried at an air temperature of 210° F. for 4 minutes. One face of the dyed material is then sprayed with a mist of a brown pigmented 25.5% solution of the same polyurethane in a solvent blend (which blend is composed of 50% N,N'-dimethylformamide, 35% cyclohexanone and 15% acetone) said pigmented solution containing about 19 parts of pigment per 100 parts of polyurethane. The spray is applied lightly, so that it does not cover the surface completely, whereby there are deposited tiny spaced darker areas so as to give a tone-on-tone effect. FIG. 16 is a photomicrograph of the sprayed surface and FIG. 17 is a photomicrograph of the opposite surface. FIG. 16 shows the localized deposition of non-fibrous pigmented polyurethane and, probably, the fusion of some of the transparent unpigmented fibers therewith at the surface.

EXAMPLE 7

(a) The procedure of Example 1a is used except that there is a single cup (which is traversed at the same rate, 96 feet per minute), the web is stationary, the feed rate is roughly 3.2 ounces per minute and the elapsed time is only 5 minutes. There is employed a mixture made by blending 10 pounds of the 15% solution of the polyurethane in THF with 57 grams of a yellow pigment paste (containing about 30% pigment dispersed in about 70% of an ester plasticizer of the type commonly used to plasticize polyvinyl chloride).

(b) After about 460 grams of the mixture described in Example 7a has been consumed the remainder of the mixture is diluted with 6 pounds more of the 15% polyurethane solution and a fibrous sheet is formed from the resulting mixture under the same conditions as used in Example 7a.

(c) After some 460 grams of the mixture described in Example 7b is consumed, it is blended further with 10 pounds of the 15% polyurethane solution and 166 grams of a paste containing some 30% of blue pigment in some 70% of ester plasticizer (of the same type used in Example 7a) and about 1480 grams of the resulting mixture is consumed in sheet-forming trials, after which 40 grams of a paste containing about 15% of black pigment in about 85% of an ester plasticizer (of the type commonly used to plasticise polyvinyl chloride) is added and the thus-formed mixture is employed for forming a green-colored fibrous sheet under the conditions described in Example 7a except that the feed rate is about 6.4 ounces per minute and the elapsed time is 8 minutes.

(d) After some 1480 grams of the mixture described immediately above is used in sheet-forming trials, an additional 40 grams of the same 15% black pigment paste is added to the remainder of that mixture and the thus-formed mixture is used forming another (darker) green-colored fibrous sheet under the conditions described in Example 7a except that the feed rate is about 7.4 ounces per minute and the elapsed time is 8 minutes.

(e) After some 1540 grams of the mixture described immediately above is used in sheet-forming trials, an additional 80 grams of the same black paste is added to the remainder of that mixture, some 1900 grams more of the resulting mixture is used for more sheet-forming trials and finally 80 grams more of the same black pigment paste is added to the mixture that still remains. The thus-formed mixture, now black in color, is used for the formation of a fibrous sheet under the same conditions as in Example 7d except that the elapsed time is about 7 minutes.

Each of the fibrous products is heated to remove residual THF as in Example 1a. In addition the fibrous sheet of Example 7b is treated to give a smooth and somewhat glossy surface by placing the fibrous sheet flat on a firm support with one face uppermost, placing a sheet of conventional shiny release paper on the upper surface of the fibrous sheet and ironing the assembly with a hot electric hand iron (of conventional construction, with the heat set at the level conventionally used for ironing cotton fabrics) so that the heat penetrates through the release paper; the assembly is then allowed to cool and the release paper, which does not stick to the fibrous sheet, is removed. The ironing densifies the material and changes it from a very soft structure, which feels like channels, to one which resembles a plastic film. Although the top surface is glossy and has a very smooth feel, like that of a film of plastic material, microscopic examination of that surface (see FIG. 18) shows that the fibrous structure is retained. The lower surface of the ironed material is duller that the upper surface; under the microscope (see FIG. 19) it too has a fine fibrous structure. In this case the lower surface (which is believed to be the surface which was formed on the woven wire belt; see the wire impressions at 38,39) shows more fused, or thick fiber, areas than the upper surface; it is believed that these were formed during initial fiber deposition on the belt. It will also be seen that the fibers are, on the whole, generally thinner than those shown in FIGS. 5–11; this is believed to be related to the lower rate of supply of polymer to the rotating cup (and consequent formation of a thinner film of solution on the cup surface) in the production of the structure of FIGS. 18–19. As in Example 1, however, the fibers appear to be largely flattened, their widths being in the range of about two to four times their thicknesses. Despite its smooth feel and appearance the material is highly (micro) porous, and has very high breathability.

It will be understood that, because of the additions of the pastes of pigment in plasticizer, the products contain varying amounts of plasticizer. Specifically the plasticizer in the pigment pastes is a mixture of Paraplex G-50 (a well known polymeric polyester plasticizer having a molecular weight of 2200 and a saponification number of 500) and Paraplex G-62 (epoxidized soybean oil) in a ratio of about 2.2:1 (G-50; G-62), and the pigment pastes contain in the neighborhood of 50% pigment, except for the black paste which has only about 10–15% pigment.

EXAMPLE 8

The procedure of Example 1a is used, except that there is a single cup, which is traversed at a rate of 111 feet per minute and is rotated at 1800 rpm, the web is stationary, the feed rate is roughly 11.8 ounces per minute, the voltage is 90 KV, the elapsed time is about 5 minutes and there is used on unpigmented 15% solution of the polyurethane in THF.

EXAMPLE 9

The procedure of Example 1a is used except that there is a single cup, which is traversed at the rate of 111 feet per minute and is rotated (as in Ex. 1) at 900 rpm, the rim of the cup is 22.5 inches below the web, the web speed is 16.5 feet per minute, the voltage is 110 KV the feed rate is roughly 15.3 ounces per minute, the elapsed time is about 5 minutes and there is used an unpigmented 15% solution of the polyurethane in THF.

EXAMPLE 10

Example 9 is repeated except that the voltage is 90 KV the distance between the rim of the cup and the web is 18 inches, the feed rate is roughly 7.8 ounces per minute and the elapsed time is about 40 minutes.

EXAMPLE 11

The procedure of Example 1a is used except that there are 3 spaced cups, each rotating at 900 rpm on stationary vertical axes, the web speed is 70 feet per minute, the feed rate per cup is about 6 ounces per minute the voltage is 90 KV and the elapsed time is about 40 minutes. Two of the cups have four inch diameters and the third has a six inch diameter. The three cups are mounted on a header, in a straight line, at each end of which is a 4 inch diameter cup, with the 6 inch diameter cup in the middle, the distance between the axes of adjacent cups being about 35 inches. The line on which the cups are mounted runs diagonally to the path of movement of the web so that the six inch cup is under the center of the web and the four inch cups are nearer to the opposite edges of the web.

The resulting product is not uniform in thickness across its width, having three spaced thicker zones running lengthwise of the product at distances from its edges corresponding to the locations of the axes of the cups.

EXAMPLE 12

Example 11 is repeated except that the rims of the cups are maintained 16½ inches below the web and the positions of the cups are changed periodically during the run to give a product of more uniform thickness across its width, and the elapsed time is shorter than in Example 11.

EXAMPLE 13

The procedure of example 1a is used, except that there is a single cup, 2 inches in diameter and rotating at 900 rpm, with its rim is 18½ inches below the web, the web speed is 16.6 feet per minute, the traverse speed is 108 feet per minute, the feed rate is roughly 6.6 ounces per minute, the material is an unpigmented 15% solution of the polyurethane in THF and the elapsed time is about 55 minutes.

EXAMPLE 14

The procedure of Example 1a is used, except that there is a single cup, 6 inches in diameter and rotating at 900 rpm, with its rim is 19½ inches below the web, the web speed is 16.6 feet per minute, the traverse speed is 156 feet per minute, the feed rate is roughly 6.5 ounces per minute, the material is an unpigmented 15% solution of the polyurethane in THF and the elapsed time is about 45 minutes.

EXAMPLE 15

Figure 21:
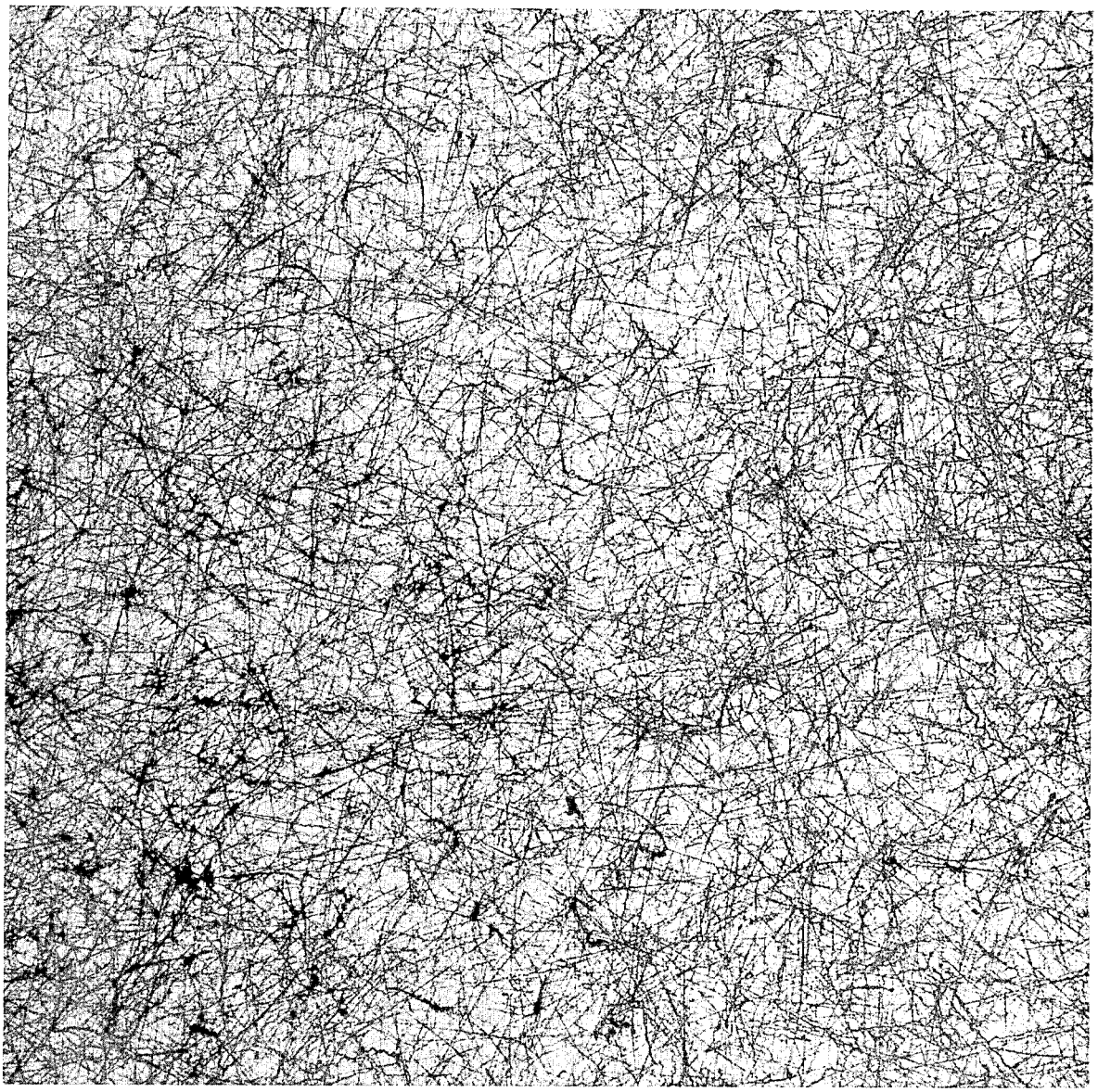

During a run such as described in Example 5 a piece of writing paper is placed flat on the fibrous sheet being being formed on the web (being attached to the fibrous sheet by conventional pressure-sensitive masking tape) and passes, with the fibrous sheet, over the two traversing cups, for one full revolution of the endless web. Polyurethane fibers are thus deposited on the exposed surface of the sheet of paper and are found to be adhered very firmly thereto. FIG. 20 is an enlarged photograph of a one inch long portion of the product on the paper and FIG. 21 is an enlarged photograph of a 4 inch square portion. It is evident from these photographs that most of the fibers are long and substantially straight and that there are very few, if any, free fiber ends. The deposited polyurethane fibers can be peeled slowly and carefully from the paper to give a very thin diaphanous polyurethane fiber web (usually still carrying some adhered paper fibers) which can be stretched reversibly in one or both directions; during such stretching the overlapping polyurethane fibers remain adhered to each other at points of contact and thus distribute the stretching force from one fiber to the other. FIG. 22 is an enlarged photograph of such a web while it is maintained stretched some 100% in one direction. FIG. 23 is an enlarged photograph of such a web while its center portion is maintained stretched some 100% in both directions, the area of that center portion thus being about 4 times its original unstretched area. (Removal of the web from the paper is facilitated by first wetting the paper).

Specifically, in preparing the material for the photograph shown in FIG. 22 the paper was moistened and the deposited polyurethane fiber structure was peeled off the wet paper after which a piece of the fiber structure was fixed at one end to a support by means of a strip of pressure sensitive transparent adhesive tape and another, parallel, strip of such tape was applied to the piece, at a distance of about one inch from the initially applied strip, then pulled by hand so as to increase the distance between the two strips of tape to about two inches and then kept at that distance by adhering that later-applied strip of tape to support. After photographing this structure (FIG. 22) a second set of two short parallel strips of the adhesive tape was adhered, about one inch apart, to the stretched piece at right angles to (but not overlapping) the first set of strips of the tape. The strips of the second set were then pulled apart manually until the distance between them was about 2 inches, and these strips were than adhered to the support in that position. The center portion of the piece was thus extended about 100% both longitudinally and transversely; (an increase in area of some 300%); the stretched structure is shown in FIG. 23. (The second set of strips of transparent tape is visible at the top and bottom of FIG. 23; also, because of the lighting angle and the nature of the support, which was a piece of white paper, shadows of many of the fibers are visible in this photograph, but the fibers themselves can readily be distinguished from their fuzzier, lighter shadows).

EXAMPLE 16

Example 9 is repeated, except that the cup is 12 inches in diameter and is traversed at 81 feet per minute (the length of the traverse being 36 inches in this case), the voltage is 90 KV, the web speed is 14 feet per minute and the feed rate is roughly 11 ounces per minute, an unpigmented 15% solution of the same polyurethane (carrying a small amount of blue dye) is used, and the time is such that a smaller total amount of the polymer is deposited. FIGS. 24, 25 are photomicrographs of surface portions of the material; the product has less straight fibers are more curled ones, and more filmy areas, than in the other products. It is believed that a less desirable fiber formation results from undue evaporation of solvent and consequent great increase in viscosity which occurs during the longer travel of the solution on the larger diameter cup of this Example and that such evaporation may be prevented by adopting suitable means to reduce evaporation, such as having a shield over the cup to maintain a solvent-rich atmosphere over the material inside the cup, the shield being maintained at the same voltage as the cup.

All the materials of the foregoing Examples show very good water vapor permeability. They are readily permeable to gases as indicated by the fact that a human cigarette smoker can blow the smoke through them. The products have good tear resistance and show excellent stitch-tear strengths. As indicated earlier, they withstand conventional dry cleaning solvents with little dimensional change; for instance when the product of Example 1b is cut into a rectangle 5½ inches by 1½ inches and soaked in perchloroethylene for 25 minutes, the resulting wet rectangle then measures about 5⅝ inches by 1 9/16 inches; after the rectangle is placed in an oven having an air temperature of 150° F. for 25 minutes to drive off the liquid the resulting dried rectangle measures about 5⅜ inches by 1 7/16 inches.

The following table I gives the results of the physical tests of samples of the sheet materials produced in the foregoing Examples. The tests of tensile strength, elongation, and energy to break were carried out with a conventional Instron table model tester (Series 123 Model D1-53) according to ASTM D882, on samples (cut from the sheet) which were 4 inches long and ½ inch wide; the samples were placed in the jaws of the tester so that the initial length of the sample between those jaws was 2.4 inches. The strain rate was 1000% per minute, i.e. 24 inches per minute for the 2.4 inch length. Because the sheet is generally soft and compressible it is difficult to give a precise indication of its thickness and, in order that one may compare sheets of different weights per unit of area, the results are given in terms of the total force (in pounds) or the total energy (in inch-pounds) divided by the weight of the sheet material per square inch of area (measured in the plane of the sheet). The measurements are made on samples out in two directions, both in the plane of the sheet, at right angles to each other, the values in such direction being given under the heading "M" and the other under the heading "T". For Examples 1–5 two sets of test results ("R" and "L") are given, corresponding to samples taken at spaced points on the right hand and left hand sides of the sheets. The tear tests are tongue tear (ALCA E-10) and are also measured with the same Instron tester. All test samples are conditioned at 23° C. and 44% R.H.

It will be seen that the tensile force per unit weight is generally at least about 30 and, particularly for the preferred more uniformly deposited sheets, is generally well above 60 (expressed in terms of pounds of force per gram of weight per square inch of surface area) and that the total breaking energy per unit weight is generally at least about 40 and preferably well above 100, expressed in terms of inch pounds of energy per gram of weight per square inch of surface area. The values for the most uniform samples are at least about 40% of the corresponding values for a film made, from the same polymer solution, by casting the solution and carefully evaporating the solvent; and greatly exceed those for fibrous structures obtained by the known process (described at the beginning of this application) of pneumatically spraying a solution of polyurethane. More specifically, a cast film (about 0.01 inch thick) of the same polymer, unpigmented, which has an elongation at break in the neighborhood of 360%, exhibits a tensile force per unit weight in the neighborhood of 160 and a total breaking energy per unit weight in the neighborhood of 330 expressed in the same units.

TABLE I

| Example | Approx. Thickness (inch) | Wt (g/in²) | | Tensile force per unit weight (pounds/g/in²) M | T | Breaking Energy per unit weight (inch pounds/g/in²) M | T | Breaking Elongation % M | T | Tearing Force per unit (pounds/g/in²) M | T |
|---|---|---|---|---|---|---|---|---|---|---|---|
| 1b | .025 | .14 | R | 86 | 57 | 182 | 186 | 306 | 314 | 14.0 | 14.3 |
|  |  |  | L | 101 | 91 | 214 | 203 | 306 | 309 | 14.5 | 13.5 |
| 2 | .02 | .12 | R | 75 | 67 | 139 | 145 | 263 | 316 | 11.0 | 11.5 |
|  |  |  | L | 75 | 65.6 | 144 | 140 | 279 | 313 | 11.1 | 11.1 |
| 3a | .025 | .147 | R | 82.5 | 50.5 | 179 | 174 | 201 | 312 | 12.4 | 11.5 |
|  |  |  | L | 73.4 | 104 | 153 | 175 |  | 302 | 15.5 | 13.1 |
| 4 | .025 | .167 | R | 88.7 | 68.7 | 118 | 145 | 271 | 297 | 10.8 | 11.8 |
|  |  |  | L | 66 | 63 | 138 | 134 | 280 | 285 | 11.4 | 11.4 |

TABLE I-continued

| Example | Approx. Thickness (inch) | Wt (g/in$^2$) | | Tensile force per unit weight (pounds/g/in$^2$) M | T | Breaking Energy per unit weight (inch pounds/g/in$^2$) M | T | Breaking Elongation % M | T | Tearing Force per unit (pounds/g/in$^2$) M | T |
|---|---|---|---|---|---|---|---|---|---|---|---|
| 5 | 0.25 | .137 | R | 75 | 69 | 150 | 142 | 281 | 271 | 13.4 | 15.3 |
|   |      |      | L | 66 | 88 | 139 | 187 | 286 | 294 | 12.3 | 13.3 |
| 6 | .03 | .193 | | 80 | 67 | 169 | 138 | 306 | 310 | 10.7 | 11.3 |
| 7a | .01 | .0631 | | 50 | 45 | 77 | 61 | 244 | 211 | 13.4 | 12 |
| 7b (ironed) | .01 | .0631 | | 48 | 57 | 65 | 94 | 221 | 241 | 7.4 | 7.1 |
| 7c | .01 | .106 | | 29 | 36 | 48 | 63 | 235 | 244 | 8.1 | 9 |
| 7d | .01 | .1035 | | 28 | 35 | 57 | 69 | 287 | 268 | 5.1 | 4 |
| 7e | .01 | .0743 | | 30 | 32 | 69 | 74 | 296 | 280 | 6.9 | 7.5 |
| 8 | .02 | .126 | | 39 | 49 | 66 | 79 | 256 | 267 | 10.4 | 11.9 |
| 9 | .03 | .083 | | 51 | 46 | 110 | 90 | 304 | 319 | 10.1 | 9.9 |
| 10 | .02 | .113 | | 31 | 52 | 42 | 98 | 279 |  | 9.7 | 11.1 |
| 11 | .04 | .27 | | 32 | 56 | 65 | 129 | 277 | 326 | 8.1 | 9.8 |
| 12 | .02 | .127 | | 69 | 59 | 151 | 113 | 320 | 288 | 11.8 | 10.3 |
| 13 | .01 | .0334 | | 55 | 47 | 88 | 69 | 270 | 219 | 19 | 20 |
| 14 | .02 | .0805 | | 72 | 63 | 155 | 116 | 344 | 308 | 16.3 | 15.2 |
| 16 | .02 | .0665 | | 24 | 30 | 30 | 44 | 225 | 234 | 8.6 | 8.5 |

The stress-strain curves for the products of the foregoing Examples are generally similar in shape to those of films made from the same polymer, but these products do not exhibit such a low resistance to extension (as indicated by the relatively gradual slope of the film curve) in the region of 50 to 150% elongation as is found in the film. The following numerical comparisons (which can easily be plotted on graph paper) indicate the shapes of typical curves. (The ordinates given below for the various curves are not necessarily in the same units from curve to curve; all the ordinates for each curve have been multiplied by a constant factor, chosen for that particular curve, so that all ordinates at 50% elongation are converted to a value of about "10" to facilitate comparisons).

| Elongation | Ordinate (Proportional to stress) | | |
|---|---|---|---|
|  | Film | Example 1b | Example 14 |
| 25% | 8 | 7 | 6 |
| 50% | 10 | 10 | 10 |
| 100% | 12.5 | 16 | 15 |
| 150% | 15.5 | 20 | 21 |
| 200% | 21 | 26 | 28 |
| 250% | 32 | 36 | 39 |
| 300% | 48 | 49 | 42 |
| 320% | 53 | 54 | 56 |
| 350% | 60 |  |  |

The Wyzenbeek abrasion test mentioned above is carried out using a convention Precision wear test dimeter (Wyco Tool Co. Model IC1, Ratio 20:1) using 8 inch by 2 inch specimens adhered to heavy cloth tape and mounted in the test apparatus under 6 pounds tension and 2 pounds applied load, with #8 canvas duck as the abrasive agent. Continued abrasion of the untreated surface of the fibrous structure results in balling up, or delamination, of surface fibers.

The embossing roll used in Example 3b is a metal roll, whose entire right cylindrical outer surface has small irregularly shaped scalloped or polyhedral hollows which are on the order of 1 mm across; the boundaries of the hollows are very thin (less than 0.1 mm in width) and form a continuous network over the entire surface of the roll, which network is within the surface of an imaginary right circular cylinder coaxial with said roll; in other words there is a "raised" network of thin lines, all the spaces between the lines being scooped out to form shallow hollows.

The polyurethane used in the foregoing Examples is prepared as follows: To 78.3 parts of tetrahydrofuran ("THF") in a stirred reactor there are added 1.9 parts of 1,4-butanediol, 11.8 parts of molten hydroxyl-terminated polycaprolactone (Niax Polyol D540", having a molecular weight of 1250), and then 7.9 parts of diphenylmethane-p,p'-diisocyanate. After thorough mixing 0.01 part of dibutyltin dilaurate is added (as a 20% solution in THF). The reaction is carried out under anhydrous conditions under a nitrogen blanket. The temperature rises, due to the exothermic reaction, and the mixture is further heated to maintain the reaction mixture under reflux (at about 65° C). Analyses for —NCO content are made and, after several hours of reaction under reflux the —NCO content becomes substantially constant and 0.2 part of 1,4-butanediol, an amount stoichiometrically equivalent to the excess —NCO, is added. The viscosity of the solution increases and when the viscosity of the solution reaches about 4500 centipoises (measured at 25° C. with a Brookfield viscometer) the reaction is terminated by adding 0.11 part of 1,4-butanediol, and 30 minutes later the mixture is cooled gradually to a temperature of about 38° C.; the solution is then diluted with 8.7 parts of THF and cooled to room temperature. The viscosity, after cooling and standing is about 1000 centipoises (measured as above, at 25° C.) and the intrinsic viscosity is about 0.9 to 1.

The intrinsic viscosity ("I.V.") is determined in highly dilute solution in analytical grade "DMF" (dimethyl formamide) which has been thoroughly dried by storage under a nitrogen atmosphere over a molecular sieve (Linde 5A). Four measurements at 25° C. corresponding to four, approximately equally spaced, concentrations are made, and intrinsic viscosity and polymer-solvent interaction parameter are determined by the Huggins equation:

$$\eta_{sp}/C = [\eta] + k'[\eta]^2 C$$

where $\eta_{sp}$ is the specific viscosity and C is concentration expressed in g/100 ml, and $[\eta]$ is the intrinsic viscosity.

In making a polyester polyurethane one may employ a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length.

Typical polyethers which are used to provide the soft segments for elastomeric polyether polyurethane are usually of aliphatic character. One type has the formula $H(RO)_nH$ where R is a divalent alkylene radical, such as tetramethylene or ethylene or propylene, and "n" denotes the degree of polymerization.

A preferred diisocyante is diphenyl methane -p,p'-diisocyanate, but other diisocyanates may be used as such or in admixture therewith. Examples of other diisocyanates are 2,4-toluene diisocyanate, p,p'-diphenyl diisocyanate tetramethylene diisocyanate, and methylene bis(4-cyclohexylisocyanate).

One preferred chain extender is tetramethylene glycol. Other chain extenders may be used as such or in admixture. Examples of such other difunctional chain extenders are other dihydric alcohols such as ethylene glycol, hydroxy amines such as 2-amino-ethanol, diamines such as ethylene diamine, or water. The amount of chain extender is preferably such as to produce a thermoplastic product of high intrinsic viscosity.

In the preferred class of polyester polyurethanes made with diphenylmethane-p,p'-diisocyanate, those having nitrogen contents in the range of about 3½ to 4½% most preferably in the neighborhood of 4% (e.g. 4.1%) have been found to be particularly suitable.

Preferably the polyurethane material has a melting point of at least 100° C. preferably above 150° C. (e.g. about 170 to 200° C. or more, as measured by differential thermal analysis or differential scanning calorimetry), and an elongation at break of at least about 300%.

The polyurethane material may be composed of polyurethane per se. It is also within the broad scope of the invention to use polyurethane materials which are blends of polyurethanes and other high polymers such as a vinyl chloride polymer (e.g. the vinyl chloride copolymers known as Bakelite VYHH or VAGH, containing vinyl acetate as a comonomer) or a rubbery copolymer of a conjugated diolefin and acrylonitrile (e.g. the butadiene-acrylonitrile copolymer known as Hycar 1031). The amount of such other high polymer is generally below 40% (e.g. 10% or 20%) of the total weight of the blend.

While the invention has thus far formed its greatest utility using high molecular weight end-capped thermoplastic polyurethane, without further polymerization thereof after formation of the fibrous structure, it is also within the broader scope of the invention to attain the final molecular weight after the fibers have been deposited, as further chemical reaction, such as chain-extending and/or cross-linking, of the polymer after deposition. Techniques for such further chemical reaction are very well known in the polyurethane art. For instance one may deposit fibers of a polymer having "blocked" isocyanate groups as its end groups and having mixed therewith a suitable proportion of a chain extender or cross-linking agent and then "unblock" the isocyanate groups, as by heating the fibrous structure, whereby the unblocked isocyanate groups react with the chain extender or cross-linking agent. Or the chain extender (e.g. hydrazine vapors) or cross-linking agent may be applied to the fibrous structure, during the unblocking step, for such reaction. (Blocking agents for the isocyanate groups, and unblocking temperatures, are disclosed at pages 11-13 of the book "Polyurethane Technology" (edited by Paul F. Bruins pub. 1969 by Interscience Publishers), and such disclosure is incorporated herein by reference).

It is also within the broader scope of the inventions to use other fiber-forming water-insoluble elastomers, generally, in place of the polyurethane material. Such elastomers are well known in the art; see for instance, the article on "Elastomers, Synthetic" in Encyclopedia of Polymer Science and Technology Vol. 5 (1966), John Wiley & Sons, and particularly the various types of elastomers listed at page 406-420 thereof. Especially suitable are those elastomers, there listed, which are soluble and do not require subsequent vulcanization to attain high tensile strengths.

A discussion, incorporated herein by reference, of the chemical nature, production and properties of thermoplastic polyurethanes is found at pages 197-214 of "Polyurethane Technology" (edited by Paul F. Bruins pub. 1969 by Interscience Publishers).

The polymer may contain one or more stabilizers against degradation, e.g. hydrolysis stabilizers, light stabilizers, antioxidants, etc. These are well known in the art. See, for instance, the section on Compounding Thermoplastic Polyurethanes starting at page 208 in the previously cited book "Polyurethane Technology."

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. A process for producing fibrous structures comprising:
    (a) supplying a liquid solution of a thermoplastic elastomeric polyurethane in a volatile solvent to a surface rotating about an axis to form thereon a film which is whirled from said surface by centrifugal force,
    (b) maintaining an electrostatic potential between said film and a collecting surface transverse to said axis to form said solution into electrically charged fibers, to attract said fibers to said collecting surface in a fiber pattern which, owing to said centrifugal force, is a whirling pattern annular to said axis, and to deposit, on said collecting surface, fibers oriented circumferentially of said annular pattern in paths having a radius of curvature above 4 cm.
    (c) evaporating said solvent during the travel of said solution from the rotating surface to said collecting surface so that the deposited fibers contain sufficient solvent to bond to fibers previously deposited upon said collecting surface, and thereby form a fibrous structure and
    (d) removing said deposited fibrous structure from said collecting surface, the distance between said collecting surface and said film being sufficient that there is no spark or visible corona discharge passing through the atmosphere from the rotating surface carrying said film to said collecting surface, said supplied solution of step (a) having a viscosity of above 500 centipoises and said polyurethane having an intrinsic viscosity of above 0.7.

2. Process as in claim 1 in which the rotating surface is maintained at a positive potential of at least about 50 KV and said collecting surface is grounded.

3. Process as in claim 1 in which the solution contains about 5 to 20% of the polyurethane dissolved in tetrahydrofuran and the polyurethane is a polyester polyurethane having an intrinsic viscosity of at least about 0.9.

4. Process as in claim 1 and including the step of moving said collecting surface whereby to transverse said annular pattern over said surface.

5. Process as in claim 4 in which said collecting surface is a moving endless web having a substantially flat collecting face perpendicular to said axis and said axis is stationary.

6. Process as in claim 4 in which said collecting surface if a moving endless web having a substantially flat collecting face perpendicular to said axis and said axis is traversed in a direction transverse to the movement of said collecting face.

7. Process as in claim 1 in which the process is effected in a substantially quiescent atmosphere.

8. Process as in claim 1 in which said rotating surface has an external circular rim over which said film of solution flows, the rate of rotation being such that said rim moves at a speed above about 3000 inches per minute.

9. Process as in claim 1 in which said process is continued so as to deposit fibers one onto the other until the deposited fibrous structure weighs at least about 30 grams per square yard, and a volatile solvent for said elastomer is then applied to one face of the fibrous structure in amount sufficient to smooth it and increase its abrasion resistance but insufficient to destroy its main fibrous structure.

10. Process as in claim 1 in which said fibers are deposited on a three dimensional body whose surface is said collecting surface, and said body and said axis are moved relative to one another whereby to deposit a continuous hollow fibrous structure around said body.

11. Process as in claim 10 and including the step of stripping said hollow fibrous structure from said body.

12. Process as in claim 1 and including the step of heating said deposited fibrous structure to remove residual volatile solvent.

13. Process as in claim 1 in which said axis is vertical and said collecting surface is horizontal and situated above said rotating surface, and the process is effected in a substantially quiescent atmosphere.

14. Process as in claim 1 in which said solution contains a polyurethane having an intrinsic viscosity of at least about 0.9 dissolved in tetrahydrofuran.

15. A process as in claim 1, said process yielding a fibrous structure consisting essentially of substantially straight elastomeric fibers extending substantially parallel to the surface of said structure, said fibers criss-crossing in all directions and being autogenously bonded to each other at crossing points without substantial change in width at their bond points, said structure having a density within the range of 0.1 to 0.6 g/cc., the process being continued until the weight of the deposited structure is above 15 grams per square yard.

16. Process as in claim 15 and including the step of heating said structure to remove residual volatile solvent after removing said structure from said collecting surface.

17. Process as in claim 5 in which there are a plurality of said rotating surfaces each having a stationary vertical axis of rotation, said rotating surfaces being spaced across the width of said web.

18. Process as in claim 14 in which the radius of curvature in step (b) is greater than 7 cm, the construction and arrangement is such that in its flow at said rim said film is in contact with a solid confining surface only at one face of said film, the opposite face of said film at said rim being exposed to the atmosphere, and in which said collecting surface is a moving endless web having a substantially flat horizontal collecting face, there are a plurality of said rotating surfaces below said collecting face, each of said plurality having a stationary vertical axis of rotation, said rotating surfaces being spaced across the width of said web, said process being effected in a substantially quiet atmosphere and yielding a fibrous structure consisting essentially of substantially straight elastomeric fibers extending substantially parallel to the surface of said structure, said fibers criss-crossing in all directions and being autogenously bonded to each other at crossing points without substantial change in width at their bond points, said structure having a density within the range of 0.1 to 0.6 g/cc., the deposition being continued until the weight of the deposited structure is above 15 grams per square yard.

19. The fibrous structure produced by the process of claim 1.

20. A fibrous structure produced by the process of claim 18.

* * * * *